July 5, 1949.  E. TORCHEUX  2,475,412
RADIO DIRECTION FINDER
Filed Nov. 19, 1945  2 Sheets-Sheet 1
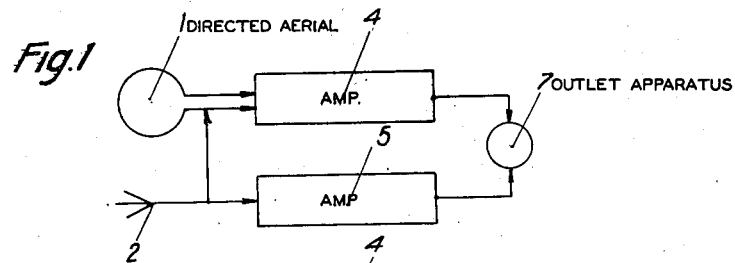
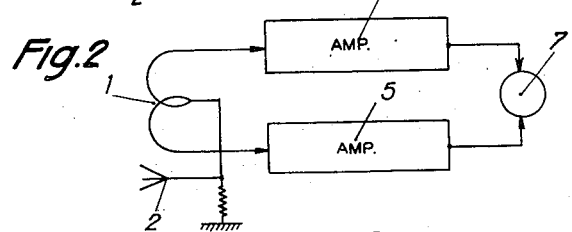
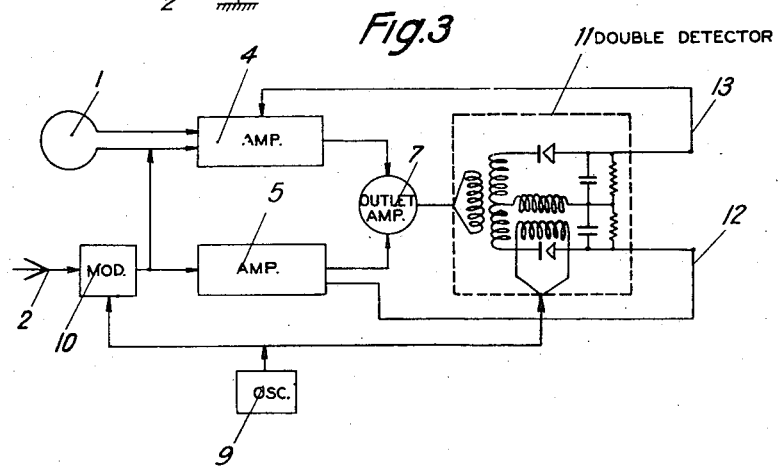
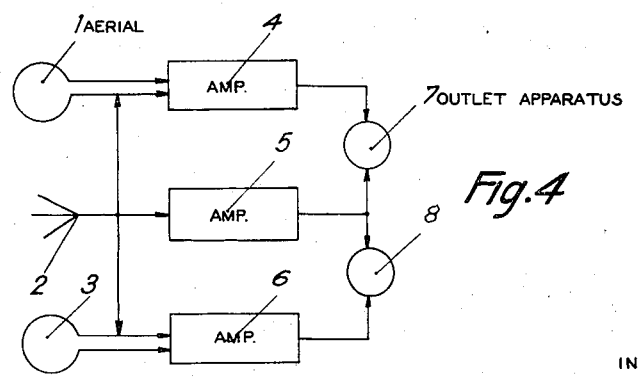
INVENTOR
EMILE TORCHEUX
AGENTS July 5, 1949.   E. TORCHEUX   2,475,412
RADIO DIRECTION FINDER
Filed Nov. 19, 1945   2 Sheets-Sheet 2
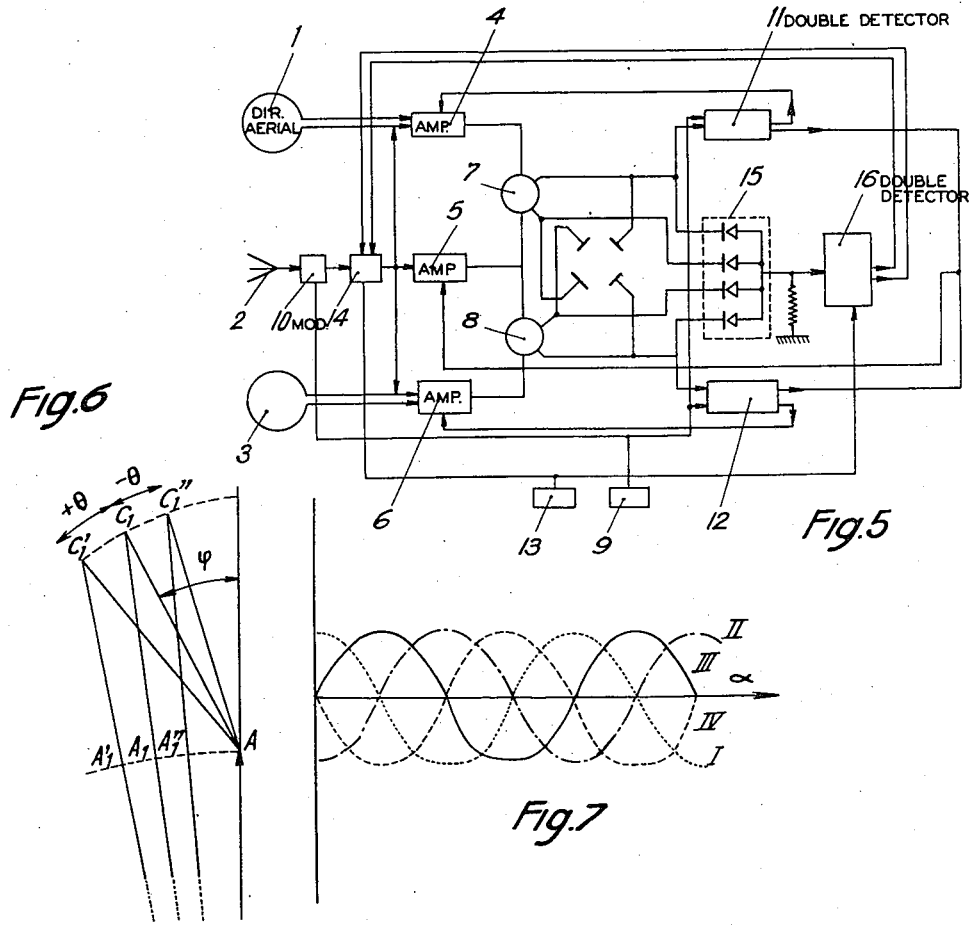
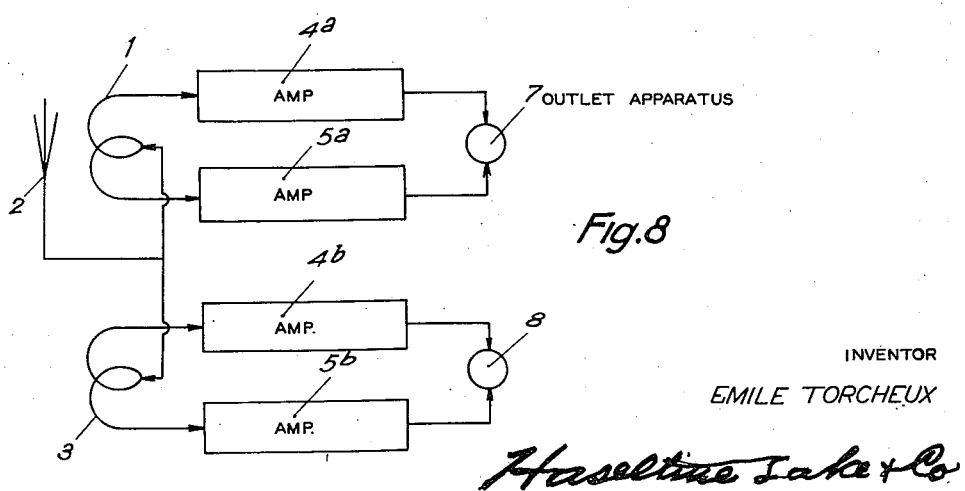

Patented July 5, 1949

2,475,412

UNITED STATES PATENT OFFICE 2,475,412

RADIO DIRECTION FINDER

Emile Torcheux, Paris, France, assignor to Societe Francaise Radio Electrique, a corporation of France Application November 19, 1945, Serial No. 629,638
In France February 14, 1942

Section 1, Public Law 690, August 8, 1946
Patent expires February 14, 1962

4 Claims. (Cl. 343—121)

This invention relates to radio direction finders.

Various radio direction finders with direct reading indicators are already known. In general they are based on a periodic exploration of the field.

In certain systems this exploration is circular and is carried out by means of a rotating directional antenna or of any system which effects an imaginary rotation of the directional antennas, these members being optionally combined with a non-directional antenna.

In other systems, successively one after the other the results of the different combinations of directional antennas and non-directed aerials, are delivered into the same amplifier, these being sorted out at the outlet.

In these two systems the outlet supplies an indicator which gives the bearing of the field effected in the course of a period or the mean of the bearings in the course of a number of exploration periods.

These periodic exploration direction finders all have one or more of the following defects:

(a) The de-phasings which are produced in the amplifiers lead to errors of bearing.

(b) The reading of the bearing of the telegraphic signals is tiring.

(c) The bearings may become very difficult if the duration of the signals is of the order of size of the exploration period.

(d) It is not easy to discriminate between two telegraphic signals emitted on adjacent frequencies.

(e) The selectivity is bad since the amplifier must faithfully transmit the results of the exploration and these frequently modulate the signal at high frequencies.

(f) The removal of uncertainty is not permanent.

The present invention has for its object to remedy these defects by providing means for suppressing the periodic exploration.

Several embodiments of the invention will now be described with reference to the illustrative examples in the accompanying drawings wherein:

Fig. 1 shows diagrammatically the simplest embodiment with a single directional antenna;

Fig. 2 shows a modification with a frame antenna;

Fig. 3 shows means for equalizing the coefficients of amplification of the components of Figs. 1 and 2;

Fig. 4 shows diagrammatically a practical embodiment combining the data of two devices of the embodiment shown in Fig. 1;

Fig. 5 shows diagrammatically means for comparing the data and controlling the regularity of the embodiment of Fig. 4;

Figs. 6 and 7 show graphically some of the data obtained from the embodiment of Fig. 5; and Fig. 8 shows how the principle of Fig. 2 can be adapted to the embodiment of Fig. 4.

In order to enable the principle of the invention to be readily understood, the means according thereto for suppressing the periodic exploration will be described as applied by way of example to the production of a "homing" device shown diagrammatically in Figure 1.

In the symbols used, an alternating potential is designated by a vector, for example $$\vec{A}$$

and detected potential $$\vec{A}$$

is proportional to the modulus of $$\vec{A}$$

i. e. to $$[\vec{A}]$$

Hence, at the output of a detecting amplifier 5 to which is fed a potential $$\vec{A}$$

there is collected a potential $$K5[\vec{A}]$$

wherein K5 is a coefficient of proportionality.

Referring now to Figure 1, a directed aerial 1 and a non-directed aerial 2 each collect potentials $$\vec{C_1} \text{ and } \vec{A}$$

induced by the field of a transmitter, the bearing of which is desired to be known. On the one hand, $$\vec{A}$$

is amplified K5 times and detected in an amplifier 5. On the other hand, $$\vec{A}$$

is composed in phase or in phase opposition with $$\vec{C_1}$$

$$\vec{A}+\vec{C_1}$$

is amplified K4 times and detected in an amplifier 4. In other words, the combination of the above-described vector quantities may be defined as being linear, respecting their phase relations; more particularly, such relations are difinable as phases combined along a common diameter of a rotating vector. At the outlets of said pair of amplifiers 4 and 5 connected to an outlet apparatus 7 are collected, with respect to the magnitude, potentials equal to:

$$K5[\vec{A}] \text{ and } K4[\vec{A}+\vec{C_1}]$$

If $K4=K5$ the potential at the terminals of the outlet apparatus 7, $$\left(K4[\vec{A}+\vec{C_1}]-K5[\vec{A}]\right)$$

will be zero at the extinction of the directed aerial 1 and will be positive or negative according to the direction in which the aerial is moved away from its extinction position. This is what characterises the "homing" device.

It may also be realised by combining $$\vec{A} \text{ and } \vec{C_1}$$

as shown by Figure 2, where the aerial potential is brought to the centre of a frame 1, the terminals of the frame feeding a pair of detector amplifiers 4 and 5. On the one hand, $$\vec{A}-\frac{\vec{C_1}}{2}$$

is amplified K4 times and detected in amplifier 4. On the other hand, $$\vec{A}-\frac{\vec{C_1}}{2}$$

is amplified K5 times and detected in amplifier 5. Between the outlets of amplifiers 4 and 5 are collected in an apparatus 7:

$$K4\left[\vec{A}+\frac{\vec{C_1}}{2}\right]-K5\left[\vec{A}-\frac{\vec{C_1}}{2}\right]$$

As in the preceding case, if $K5=K4$ the homing device is realised.

In practice the equality $K5=K4$ cannot be long preserved, since the valves vary in time. Furthermore this equality cannot be maintained over the whole extent of a frequency range, on account of the errors of single control. Means of sufficiently equalising the coefficients K4 and K5 will now be described.

One such means is shown in Figure 3, which is derived from Figure 1. The potential of an oscillator 9 of low frequency F modulates in a modulator 10, at the rate $t$, the amplitude of the potential $$\vec{A}$$

supplied by the non-directive aerial. This modulated potential is applied, on the one hand, to a frame 1 connected to an amplifier 4, and on the other hand to an amplifier 5. The detector amplifiers 4 and 5 feed an outlet apparatus 7. The potential of frequency F collected in the outlet apparatus 7 is independent of $$\vec{C_1}$$

(since $$\vec{C_1}$$

is not modulated) and is equal to $$(K4-K5)t[\vec{A}]$$

It is zero if $K5=K4$. It is in phase or in opposition of phase with the potential of the oscillator 9, according to whether K4 is greater or less than K5. This potential is then combined with the potential of the oscillator 9 in a double detector 11 which gives at its outlet between lines 12 and 13 a continuous positive or negative potential, according to the relative measures of amplification of the amplifiers 5 and 4. Lines 12 and 13 are respectively connected to the volume controls of the two detector amplifiers 4 and 5, the manner of their connection thereto being suitable for the continuous potential thus applied to each of the amplifiers to bring equality of the gains K5 and K4 by the known process of anti-fading.

The operation of this regulator may be improved by placing at the inlet of the double detector 11 a band filter calibrated to the frequency F, in order to eliminate other possible frequencies.

The regulation is only thus made when a wave is received on the path of the non-directive aerial, since there can only be modulation if there is a signal. If the frequency of this signal is too low there is permanently injected into the non-directed aerial a wave of frequency sufficiently near to the frequency to be received (pilot wave) for both to pass into the amplifiers with the same gain. The regulation takes place without any potential appearing in the outlet indicator.

Naturally a plurality of the foregoing means may be used simultaneously.

The realisation of a direct reading radio-direction finder will now be described. Referring again to the "homing" device of Figure 1 and assuming that $$\vec{A} \text{ and } \vec{C_1}$$

are in phase or in opposition of phase there will be obtained at the terminals of the outlet apparatus:

$$K([\vec{A}+\vec{C_1}]-[\vec{A}])=K[\vec{C_1}]$$

in which $$\vec{C_1}=\vec{C}\cos\alpha$$

and $\alpha$ is the angle made by the plane of the directed aerial with the direction of the transmitter. Two "homings" are assembled as shown by Figure 4. The two directive aerials 1 and 3 are displaced by 90° with respect to one another and the amplifier 5 of $$\vec{A}$$

is common. There will be collected at the apparatus 7, $$\vec{C}\cos\alpha$$

and at the apparatus 8, $$\vec{C}\sin\alpha$$

These two potentials are applied to two pairs of plates of an oscillograph or to the two rectangular frames of a phase meter. The spot or the needle as the case may be will indicate the bearing of the transmitter.

The exactitude of the indication requires several conditions:

(1) The amplifications of the amplifiers 4, 5 and 6 must be equal. The means permitting this condition to be obtained have been previously described. Naturally it is possible to regulate amplifier 4 with respect to amplifier 5 and in the same way amplifier 6 with respect to amplifier 5 as in the system of Figure 3.

(2) It is necessary that at the inlets to amplifier 4 and amplifier 6 and for a bearing $\alpha$ of 45°, the ratios of the potentials arising from the directed aerials and from the non-directed aerial shall be equal $$\left(\frac{\vec{C_1}}{\vec{A}}=\frac{\vec{C_2}}{\vec{A}}\right)$$

and shall not depend upon tuning of the directed aerials. For this purpose, care will require to be taken with respect to the usual considerations of symmetry and $$\vec{A}$$

will be composed with $$\vec{C}$$

in the actual circuit of the directed aerial in such manner that the in-tune of this aerial reacts in the same way from the point of view of phase and amplitude on the potential issuing from $$\vec{A}$$

and on the potential issuing from $$\vec{C}$$

Any error due to possible out-of-tune of this aerial will thus be avoided. The diminution of amplification due to this out-of-tune is automatically compensated by the regulation of amplification.

(3) It is necessary that on their composition $$\vec{A} \text{ and } \vec{C}$$

should not be too much de-phased between themselves. Actually there will be at 7:

$$K\left(\left[\vec{A}+\vec{C\cos\alpha}\right]-\left[\vec{A}\right]\right)$$

and at 8:

$$K\left(\left[\vec{A}+\vec{C\sin\alpha}\right]-\left[\vec{A}\right]\right)$$

whence $$\frac{\left[\vec{A}+\vec{C\cos\alpha}\right]-\left[\vec{A}\right]}{\left[\vec{A}+\vec{C\sin\alpha}\right]-\left[\vec{A}\right]}=\frac{\cos\beta}{\sin\beta}$$

where $\alpha$ is the real bearing and $\beta$ the bearing read. The error $\alpha-\beta$ may exceed 1° for the most unfavourable bearing $\alpha$ if the angle $\varphi$ of de-phasing between $$\vec{A} \text{ and } \vec{C}$$

exceeds ±20°.

In order to make $\varphi \cong 0$, one method represented by Figure 5 consists in modulating by $\pm\theta$ degrees the phase of the potential $$\vec{A}$$

supplied by the non-directed aerial by means of an oscillator 13 of low frequency $F_1$. As shown by Figure 6, which represents the composition of the vectors $$\vec{A} \text{ and } \vec{C}$$

when $\varphi$ is different from 0, the composition of $$\vec{A} \text{ with } \vec{C_1}=C\vec{\cos\alpha}$$

causes the appearance of a modulation of amplitude of frequency $F_1$, the amplitude of which is proportional to $C'I$, $A'I-C''I$, $A'''I$ and is approximately equal to:

$$\frac{K}{2}[\cos(\phi+\theta)-\cos(\phi-\theta)]C\cos\alpha=$$
$$(-K\sin\phi\sin\theta)(C\cos\alpha)$$

There are at 7 (Figure 5) two systems of detection: (A) A first system causing the appearance of $$\left[\vec{A}+C\vec{\cos\alpha}\right]-\left[\vec{A}\right]$$

and giving at its outlet with respect to magnitude a continuous potential ($C_1,A_1$ of Figure 6) equal to $C\cos\alpha\cos\varphi$ approximately and an alternating potential of $F_1$ frequency equal to about:

$$(-K\sin\varphi\sin\theta)(C\cos\alpha)$$

(B) A second system which causes the appearance of $$\left[\vec{A}\right]-\left[\vec{A}C\vec{\cos\alpha}\right]$$

and gives at its outlet the two potentials:

$$-C\cos\alpha\cos\varphi \text{ and } (K\sin\varphi\sin\theta)(C\cos\alpha)$$

At 8 two other systems of detection give:

$$C\sin\alpha\cos\varphi \text{ and } (-K\sin\varphi\sin\theta)(C\sin\alpha) -$$
$$C\sin\alpha\cos\varphi \text{ and } (K\sin\varphi\sin\theta)(C\sin\alpha)$$

The continuous components of the four preceding potentials:

(I)      $C\cos\alpha\cos\varphi$
(II)     $-C\cos\alpha\cos\varphi$
(III)    $C\sin\alpha\cos\varphi$
(IV)    $-C\sin\alpha\cos\varphi$ are represented in terms of the bearing $\alpha$ by Figure 7.

Referring again to Figure 5, these four potentials act on the four deviating plates of the outlet oscillograph, the spot of which indicates the bearing of the transmitter. On the other hand, these four potentials are applied to four systems of unilateral conductability 15. The low frequency potential $F_1$ collected at the outlet of 15 will be that which accompanies the most negative continuous potential. It has always the sign of $\sin\varphi.\sin\theta$. This potential is combined with that coming from the oscillator 13 in a double detector 16 identical, in principle, with that shown at 11 in Figure 3 and operating in the manner described. There is then obtained at the outlet a positive or negative continuous potential according to the sign of $\varphi$, since $\theta$ reverses at the same time as the potential coming from the generator 13. This continuous potential controls the tuning of A in the sense tending to annul $\varphi$ by means for example of a variable capacity, the movable part of which is integral with the moving element of an electromagnetic measuring apparatus.

The modulation of phase which can be made for example by modulating the tuning capacity $\gamma$ of the non-directive aerial from $\pm\Delta\gamma$ to the frequency $F_1$, is in general accompanied by a modulation of amplitude to this same frequency. This modulation does not affect the regulation, since, in the same way as the modulation which serves for the regulation of the amplification, it disappears at the outlet.

Naturally a direct reading radio-direction finder may be made by assembling two "homings" of the type shown in Figure 2 according to the general scheme of Figure 8.

There will be collected at the apparatus 7, $C \cos \alpha$, and at the apparatus 8, $C \sin \alpha$. In this way the preceding case is in effect reproduced. The common amplification of four displaced intermediate frequencies or of four modulated frequencies, the regulation of the amplification of the four amplifiers and the regulation of the aerial phase are equally applicable to this case.

The invention is susceptible to variations as regards for example the means selected to produce the various electrical effects and all such variations are to be understood as within the general scope of the invention as delineated in the following statement of claim.

What I claim is:

1. A radio-direction-finder comprising a directional antenna, a non-directional antenna, a plurality of transmission paths, coupling means between said antennas and said paths, said coupling means being arranged and adjusted to combine linearly respecting phase the potentials supplied by said antennas and to extract therefrom two derived potentials having a modulus difference independent from the potential of said non-directional antenna, a detector-amplifying device for each said path connected and arranged to detect and amplify respectively each said derivated potential, a direction indicator connected to the output of said devices to supply indications proportional to the differential potential between said detected potentials, a modulating device connected and arranged to supply an amplitude-modulated potential derived from the potential supplied by said non-directional antenna before combination, means for comparing the phase of said amplitude-modulated potential with the phase of same frequency of the alternating component of said differential potential, and means for controlling the gain of said detector-amplifying devices, said controlling means being arranged for actuation by said comparing means in the direction which tends to eliminate said alternating component.

2. A radio-direction-finder comprising a directional antenna, a non-directional antenna, a plurality of transmission paths, coupling means between said antennas and said paths, said coupling means being arranged and adjusted to combine in phase or in phase opposition the potentials supplied by said antennas and to extract therefrom two derived potentials having a modulus difference independent of the potential of said non-directional antenna, a detector-amplifying device for each said path connected and arranged to detect and amplify respectively each said derivated potential, said detector-amplifier devices having respective gain-controlled members, a direction indicator connected to the output of said devices to supply indications proportional to the differential potential between said detected potentials, a modulating device connected and arranged to supply an amplitude-modulated potential derived from the potential supplied by said non-directional antenna before combination, and a balanced demodulating device connected to receive said amplitude-modulated potential and the alternating component of said differential potential having the same frequency and to supply to the gain control members of said detector-amplifying devices a direct current potential difference tending to eliminate said alternating component.

3. A radio-direction-finder comprising two directional antennas arranged in space quadrature, a non directional antenna, a plurality of transmission paths coupling means between said antennas and said paths, said coupling means arranged and adjusted to combine along a common diameter of a rotating vector the potential supplied by said non-directional antenna respectively with the potential supplied by each of said directional antennas and to extract therefrom two derivated potentials constituting the respective sums of the vectors of said combined potentials, three detector-amplifying devices one for each said transmission path connected and arranged to detect and amplify respectively the potential supplied by said non-directional antenna and said derivated potentials, two circuits connected to the output of said three devices and arranged to supply two differential potentials respectively from the potentials supplied by two of said devices from said derivated potentials and from the detected potential supplied by the third said device from the potential of said non-directional antenna, a direction indicator connected and arranged to receive said two differential potentials, a modulating device connected and arranged to modulate in amplitude, before combination, the potential supplied by said non-directional antenna, means for comparing the phase of said amplitude-modulated potential with the respective phase at the modulation frequency of the alternating component of each said differential potential, and means for controlling the gain of said detector-amplifying devices, said controlling means being arranged for actuation by said comparing means in the direction which tends to eliminate said alternating component.

4. A radio-direction-finder as claimed in claim 3 with the addition of a phase-modulating device connected and arranged to modulate, at a frequency differing from that of the amplitude modulation, and before combination, the potential supplied by said non-directional antenna, four unilateral conductors connected and arranged to receive respectively said two differential potentials and two potentials opposed thereto, an impedance connected parallel with said four conductors, means for comparing the phase of the potential supplied by said phase-modulating device with the phase of same frequency of the alternating current derived from said impedance and control means for controlling the phase of the potential supplied by said non-directional antenna, said control means being arranged for actuation by said last-named comparing means in the direction which tends to eliminate said alternating current.

EMILE TORCHEUX.

REFERENCES CITED

The following references are of record in the file of this patent:

UNITED STATES PATENTS

| Number | Name | Date |
|---|---|---|
| 2,213,273 | Earp | Sept. 3, 1940 |
| 2,213,874 | Wagstaffe | Sept. 3, 1940 |
| 2,252,063 | Cockerell | Aug. 12, 1941 |
| 2,274,546 | Hugenholtz | Feb. 24, 1942 |
| 2,401,565 | Holmes | June 4, 1946 |